2 Sheets--Sheet 1.

A. KLOMAN.

Improvement in Machines for Upsetting Metal-Bars.

No. 4,911. Reissued May 21, 1872.

Witnesses.

S. Schoyer Jr

D D Angell

Inventor:

Andrew Kloman

AM. PHOTO-LITHOGRAPHIC CO. N.Y. (OSBORNE'S PROCESS).

2 Sheets--Sheet 2.

A. KLOMAN.

Improvement in Machines for Upsetting Metal-Bars.

No. 4,911. Reissued May 21, 1872.

Witnesses.

S. Schoyer Jr

D O Tingell

Inventor.

Andrew Kloman

AM. PHOTO-LITHOGRAPHIC CO. N.Y. (OSBORNE'S PROCESS.)

UNITED STATES PATENT OFFICE.

ANDREW KLOMAN, OF PITTSBURG, PENNSYLVANIA.

IMPROVEMENT IN MACHINES FOR UPSETTING METAL BARS.

Specification forming part of Letters Patent No. 55,674, dated June 19, 1866; reissue No. 4,911, dated May 21, 1872.

*To all whom it may concern:*

Be it known that I, ANDREW KLOMAN, of Pittsburg, Pennsylvania, have invented a new and useful "Upsetting-Press;" and I do hereby declare that the following is a full, clear, and exact description thereof, reference being had to the accompanying drawing and to the letters of reference marked thereon.

The nature of my invention consists in a press for "upsetting" wrought-iron or steel while heated into such forms as may be desired; said press consisting in a device for holding and retaining the iron or steel in position with relation to a mold, and a former arranged on the end of a driver; and also in interposing between the motor and the driver in an "upsetting-machine" a detached wedge, which, by passing between the motor and the driver, will compensate for the shortening up of a bar of iron during the operation of upsetting it, and thus provide for the increased length required in the driver at each forward movement of it.

To enable others skilled in the art to make and use my invention, I will proceed to describe more fully its construction and operation.

Figure 1:
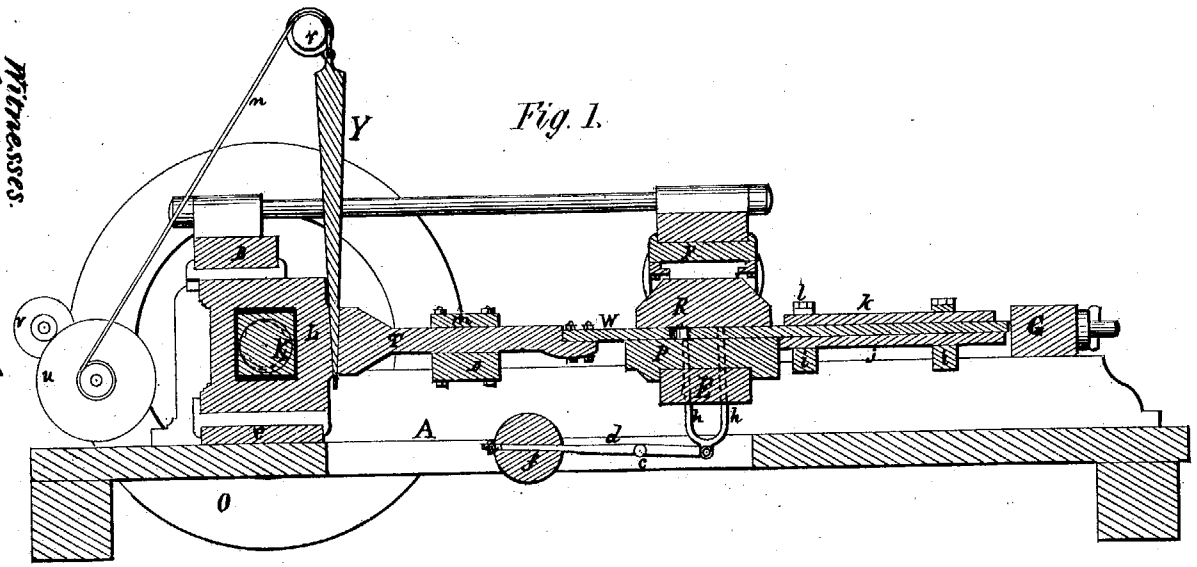
Figure 2:
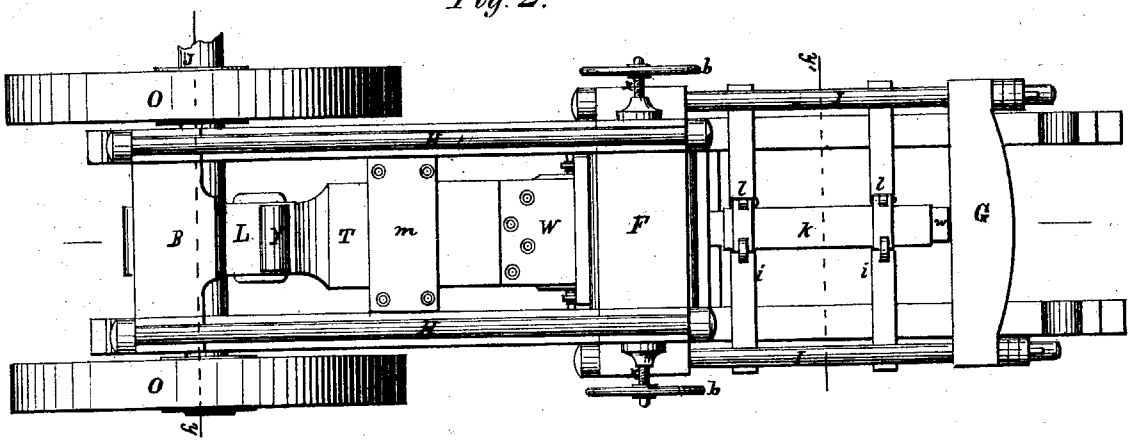
Figure 3:
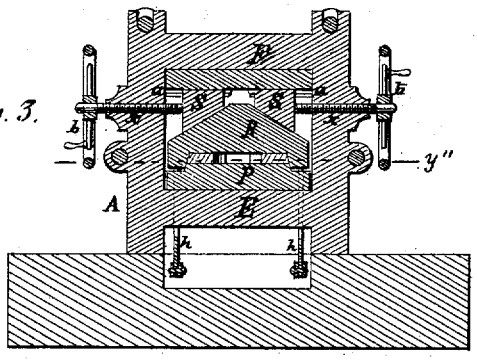
Figure 4:
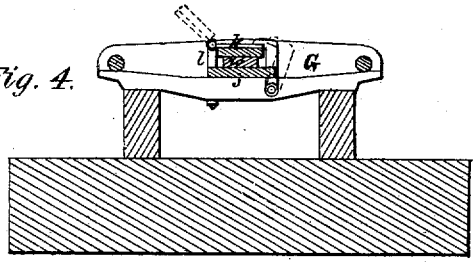
Figure 5:
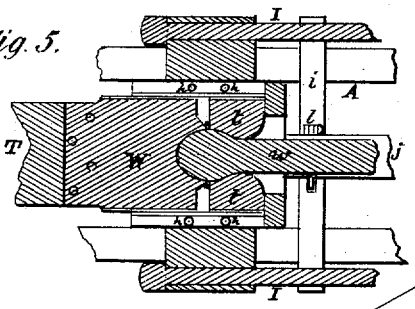
Figure 6:
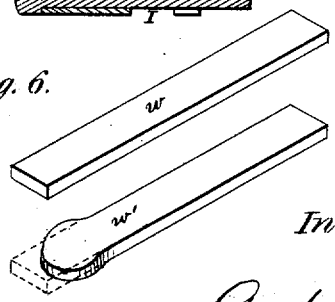

In the accompanying drawing, which forms part of my specification, Figure 1 is a vertical and longitudinal section of my improvement in "upsetting-press." Fig. 2 is a top view or plan of the same. Fig. 3 is a vertical and transverse section at line *y* of Fig. 2. Fig. 4 is a vertical and transverse section at line *y'* of Fig. 2. Fig. 5 is a transverse and longitudinal section at line *y''* of Fig. 3. Fig. 6 represents a bar of iron or steel prior to being "upset" and after being "upset."

In the accompanying drawing similar letters refer to the same parts in the several figures.

A represents a frame constructed of cast-iron, and of great strength, and is provided with transverse pieces B C D E F G, and strengthening-bars H and I. At one end of the frame A is arranged, in suitable bearings, a shaft, J, provided with a cam, K, which rotates in a yoke, L, provided with suitable slides. The shaft J is provided with two heavy balance-wheels, O. On cross-bar E is arranged a forming-piece, P, and above it, under the cross-bar F, is arranged another forming-piece, R, the upper surface of which is beveled, giving a coniformed appearance when viewed in cross-section, as shown in Fig. 3. On these beveled surfaces of the piece R, under the cross-piece F, are arranged two wedge-shaped blocks, S, which are held in position by slides *a*, and are used for forcing the forming-piece R down on the mold-pieces *t*, through the medium of screws *x*, which are provided with hand-wheels *b* for operating them. The forming-pieces are fitted together in the manner clearly indicated in Fig. 3. Below the cross-bar E is pivoted a lever, *d*, on one end of which is a heavy weight, *f*, and to the other end are pivoted forked arms *h*, which pass upward through the cross-piece E, and through the forming-piece P to the under side of the forming-piece R, as indicated in Figs. 1 and 3. This lever, with its weight *f* and forked arms *h*, is used for raising the forming-piece R, when released from the pressure of the wedge-shaped pieces S. On the cross-pieces *i* is arranged a cross-piece, *j*, above which is a cap, *k*, which is held in position with relation to the under piece *j* by means of clamping devices *l*, as shown in Figs. 1, 2, and 3. These pieces, with their clamping devices, are used for the purpose of holding the bar of iron in position, and preventing it from bending or buckling up while being subjected to the "upsetting" process. In the cross-piece D is fitted the driver T, held in position by means of the cap *m*. To the end of the driver, next the forming-pieces P and R, is secured a former, W, which enters between the forming-pieces P and R. Between the other end of the driver T and the yoke L is suspended a wedge, Y, by means of a cord or chain, *n*, which passes over a pulley, *r*. This wedge may be manipulated by hand, or raised and lowered by operating gear, as indicated by wheels *v* and *u*, which may be connected with the driving-gear of the "upsetting"-machine.

As the construction and arrangement of the several parts of my improved "upsetting"-machine, and the relation that the several parts bear to each other, will be readily understood by the skillful mechanic from the foregoing description and by reference to the accompanying drawing, I will therefore proceed to describe the operation, which is as follows: A bar of iron, such as is represented by *w* in Fig. 6, is heated, by any suitable means, at one end. The heated end is passed between the forming-pieces P R and the molds *t* until the end of it strikes the former W. The unheated portion is laid on the plate *j* with the end against the cross-bar G. It is then secured in a fixed position through the medium of the cap *k* and clamping devices *l*. The forming-piece R is then forced down upon the forming-molds *t*, through the medium of the screws *x* and wedge-shaped pieces S. Now, motion being imparted to the shaft J, the cam K will move forward the yoke L, which, pressing against the wedge Y, will move forward the driver T with its former W, which will press against the heated end of the iron *w* and press it back in the forming-molds *t* in proportion to the throw of the cam K, (which should be small,) and the cam continuing to revolve, the yoke L will be carried back, and the wedge Y will be lowered down to fill up the space occasioned by the backward movement of the yoke L. The yoke again being moved forward, will press against the wedge Y and force forward the driver T and its former W, which, pressing against the heated iron, will further force it back into the forming-molds *t*, and thus will continue to work the cam, yoke, wedge, and driver, with its former, until the heated end of the bar is "upset," as indicated in Fig. 5, and as shown by the piece marked *w'* in Fig. 6. The screws *x* are then turned back, relieving the forming-piece R from the pressure of the wedge-shaped pieces S. The forming-piece R is then raised up through the medium of the lever *d*, weight *f*, and forked arms *h*. The cap *k* is unclamped and thrown back, as indicated in Fig. 4, and the "upset"-bar of iron removed from the machine. Another bar is placed in the machine, secured in position, and the several parts of the machine adjusted with relation to the bar, as hereinbefore described, and as represented in Figs. 1, 2, and 3 of the accompanying drawing, and the bar "upset" by the action of the parts described as in the first instance, and thus one bar after another is subjected to the action of the "upsetting"-machine.

It will be observed that by each forward movement of the cam-yoke L the bar of iron placed in the machine will be shortened by the action of the driver T and former W, and that this shortening up of the bar is compensated for by the lowering of the wedge at each backward movement of the cam-yoke, thereby filling up the space between the yoke L and driver T, occasioned by the forward movement of the cam-yoke.

By constructing an "upsetting"-machine as hereinbefore described, the heated end of a bar of iron is gradually forced or driven into the form desired by the action of a cam of very small throw, whereby great power is obtained with comparatively a light-constructed machine.

The advantage of "upsetting" iron gradually, by a series of powerful strokes, will be apparent to all workers in iron. By beveling the upper surface of the forming-piece R, as shown in Fig. 3, and using in combination therewith the wedge-shaped pieces S, the screws *x* are to a very great degree relieved from the upward pressure of the forming-piece R and outward pressure of the wedge-shaped pieces S, the upward pressure occasioned by the "upsetting" of the bar of iron subjected to the action of the machine is transmitted, through the pieces R and S, to the cross-bar F, thereby relieving the screws, which would otherwise become wedged and inoperative.

Having thus described the nature, construction, and operation of my improvement in "upsetting-machines," what I claim as of my invention, and desire to secure by Letters Patent, is—

1. The combination, substantially as described, of an upsetting-tool or former, an eccentric or cam for operating said tool, and a wedge for gradually and intermittingly projecting said tool in the direction of the metal on which it is to operate.

2. The combination of the cam K, yoke L, wedge Y, and driver T, provided with a former, W, substantially as and for the purpose set forth.

3. The combination of the forming-pieces P and R and mold-pieces *t t* with the upsetting former, substantially as and for the purpose set forth.

4. The combination of the wedge-shaped pieces S, screws *x*, with the forming-pieces R, P, and *t t*, substantially as and for the purpose set forth.

5. In combination with the subject-matter of the preceding clause of claim, a lifting device, substantially as and for the purpose set forth.

6. In combination with the forming-pieces R, P, and *t t*, the plates *k* and *j* provided with clamping device *l*, and the cross-bar G, substantially as described.

ANDREW KLOMAN.

Witnesses:

S. SCHOYER, JR.,
D. D. ANGELL.